United States Patent
Haque et al.

(10) Patent No.: US 12,138,835 B2
(45) Date of Patent: Nov. 12, 2024

(54) MOLDS HAVING COOLING BEHIND INSERT TECHNOLOGY AND RELATED METHODS

(71) Applicant: Essilor International, Charenton-le-Pont (FR)

(72) Inventors: Tareq Haque, Dallas, TX (US); Gary Clark, Dallas, TX (US); David Rys, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 0 days.

(21) Appl. No.: 18/337,777

(22) Filed: Jun. 20, 2023

(65) Prior Publication Data

US 2023/0330902 A1    Oct. 19, 2023

Related U.S. Application Data

(62) Division of application No. 16/976,596, filed as application No. PCT/EP2019/055093 on Mar. 1, 2019, now Pat. No. 11,718,004.

(30) Foreign Application Priority Data

Mar. 1, 2018 (EP) .................................. 18305220

(51) Int. Cl.
*B29C 45/26* (2006.01)
*B29C 45/73* (2006.01)
*B29L 11/00* (2006.01)

(52) U.S. Cl.
CPC ...... *B29C 45/2673* (2013.01); *B29C 45/7312* (2013.01); *B29C 45/7331* (2013.01); *B29L 2011/0016* (2013.01)

(58) Field of Classification Search
CPC ................ B29C 45/2673; B29C 45/73; B29C 45/7312; B29C 45/7331
See application file for complete search history.

(56) References Cited

U.S. PATENT DOCUMENTS 6,156,242 A   12/2000  Saito et al.
6,174,481 B1   1/2001  Holowczak et al.
(Continued)

FOREIGN PATENT DOCUMENTS

DE    100 24 625 A1    11/2001

OTHER PUBLICATIONS

International Search Report for PCT/EP2019/055093 mailed Mar. 1, 2019, 5 pages.
(Continued)

*Primary Examiner* — Yunju Kim
(74) *Attorney, Agent, or Firm* — NIXON & VANDERHYE

(57) ABSTRACT

A method for creating optical articles includes moving first and second mold portions relative to one another. This disclosure includes injection molds for reducing cycle times and related methods. Some molds include first and second mold portions movable relative to one another from open to closed positions in which each recess of the first mold portion cooperates with a respective recess of the second mold portion to define a chamber. Each chambers includes a first cooling body coupled to the first mold portion, a second cooling body coupled to the second mold portion, and first and second inserts removably coupled, respectively, to the first and second cooling bodies. The inserts cooperate to define a mold cavity within the chamber configured to receive a thermoplastic material. Each of the cooling bodies has an inlet, an outlet, and a fluid cavity in fluid communication with the inlet and the outlet.

9 Claims, 8 Drawing Sheets

(56) References Cited

U.S. PATENT DOCUMENTS

| 7,517,213 B2 | 4/2009 | Lausenhammer et al. |
| 2003/0113398 A1 | 6/2003 | Chiu et al. |
| 2005/0189665 A1 | 9/2005 | Nishigaki |
| 2006/0145371 A1 | 7/2006 | Lawton et al. |

OTHER PUBLICATIONS

Written Opinion of the ISA for PCT/EP2019/055093 mailed Mar. 1, 2019, 6 pages.
Rashed, "Properties and Characteristics of Silicon Carbide," Poco Graphite, Inc., 2002, pp. 1-19.

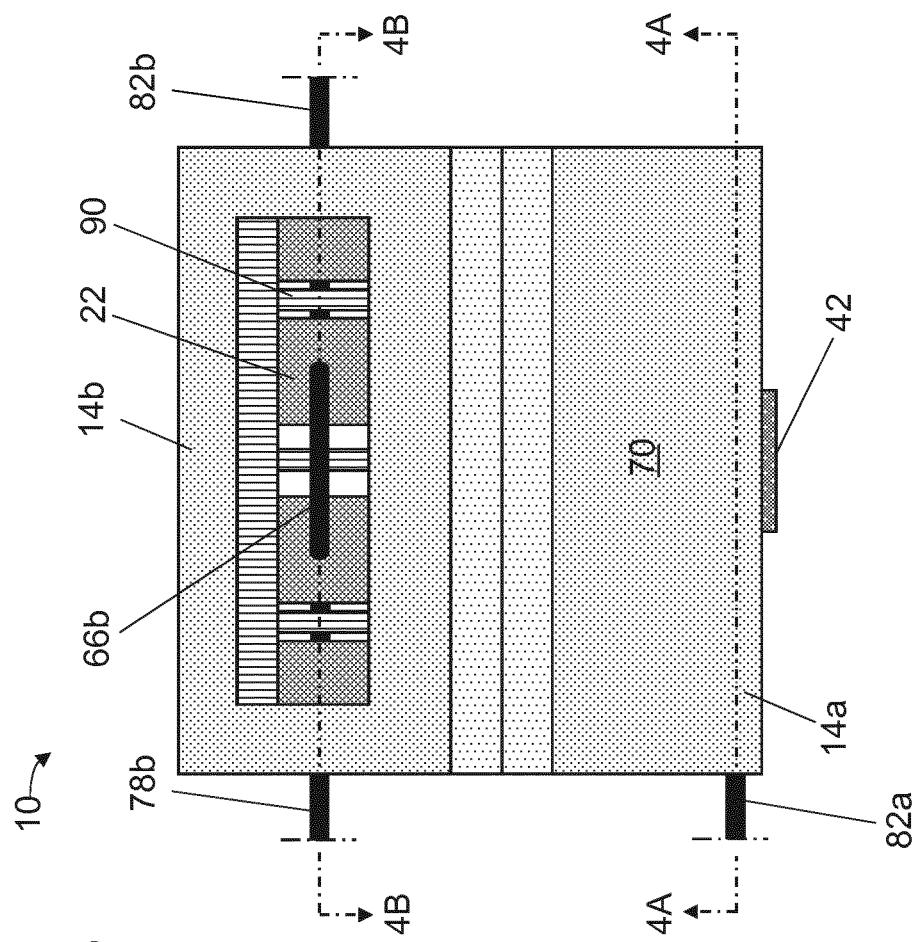
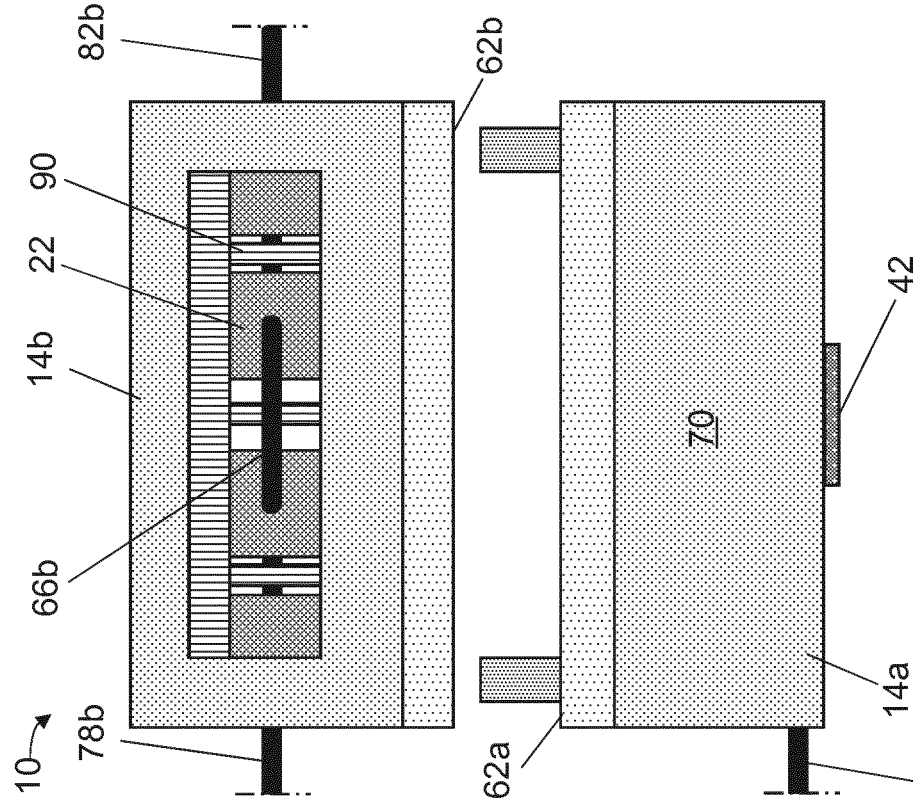
FIG. 1B
FIG. 1A

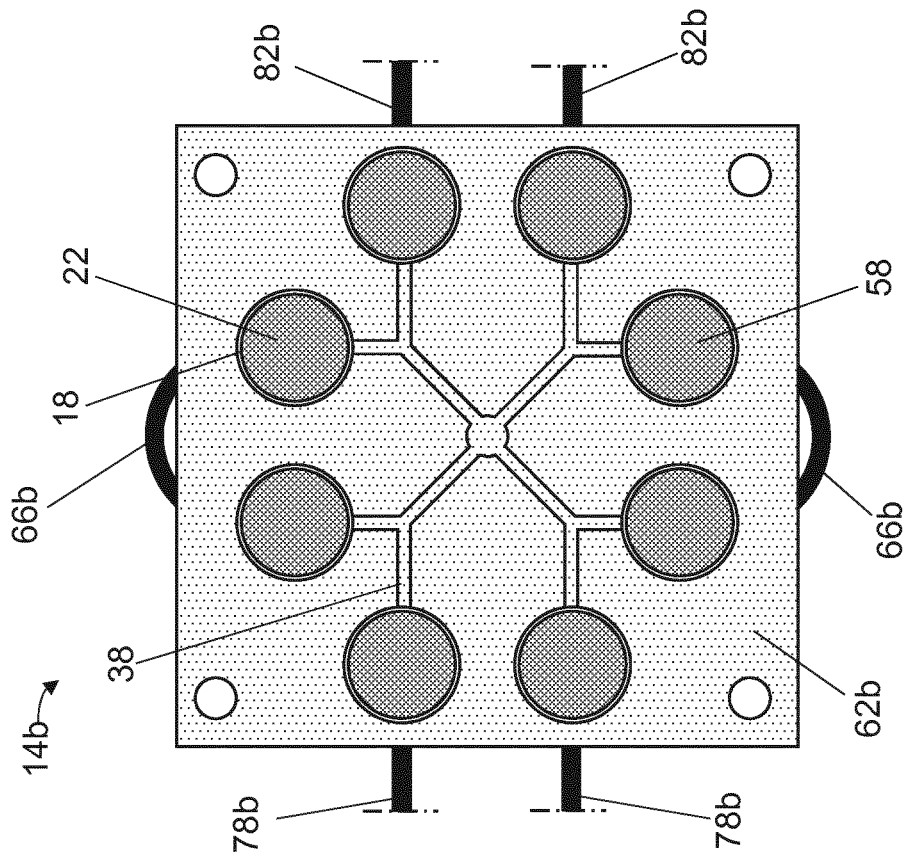
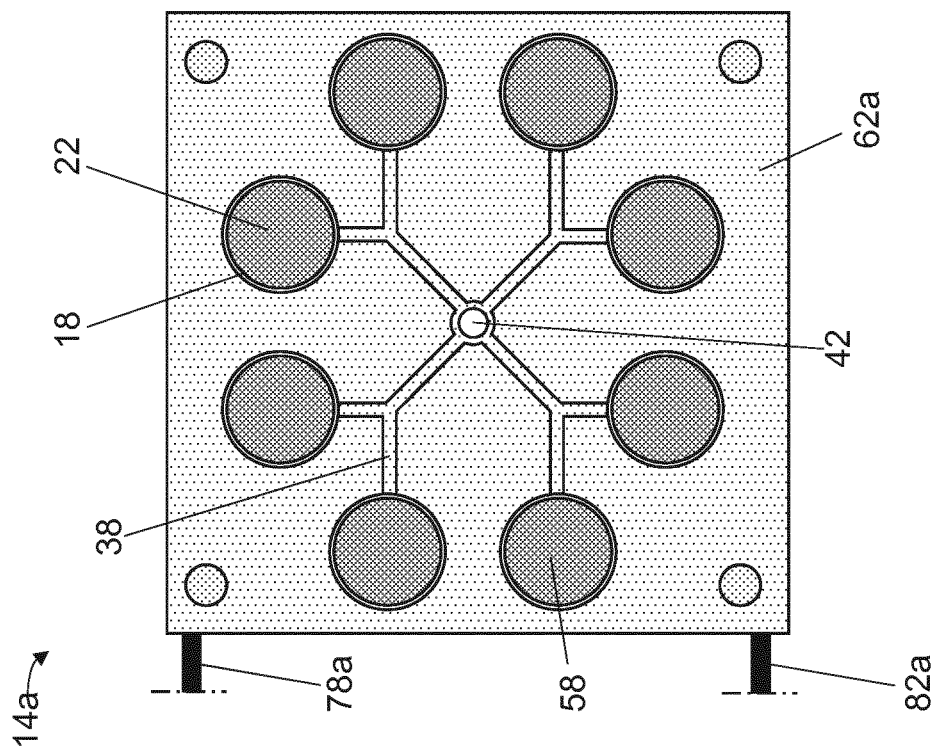

MOLDS HAVING COOLING BEHIND INSERT TECHNOLOGY AND RELATED METHODS

CROSS REFERENCE TO RELATED APPLICATIONS

This application is a Divisional of application Ser. No. 16/976,596, filed on Aug. 28, 2020, which is the National Phase under 35 U.S.C. § 371 of International Application No. PCT/EP2019/055093, filed on Mar. 1, 2019, which claims the benefit under 35 U.S.C. § 119(a) to patent application Ser. No. 18/305,220.8, filed in Europe on Mar. 1, 2018, all of which are hereby expressly incorporated by reference into the present application.

FIELD OF THE INVENTION

The present invention relates generally to injection molding machines, and more specifically, but not by way of limitation, to injection molding machines for forming one or more lenses and methods of using the same.

BACKGROUND ART

Injection molding machines that can use interchangeable mold inserts can be beneficial. For example, by using different inserts that are readily changeable, a single injection molding machine can be used to make different products. However, such inserts can inhibit heat transfer between moldable material within the mold and other portions of the mold, such as during cooling of the moldable material, thereby increasing cycle times and decreasing productivity.

SUMMARY OF THE INVENTION

Accordingly, there is a need in the art for injection molding machines that use interchangeable mold inserts while mitigating increases in cycle times typically caused thereby. Embodiments of the present molds address the above-noted limitations of existing molds by providing cooling bodies to which interchangeable inserts can be attached. Such cooling bodies can be used to cool moldable material injected into a cavity defined by the mold inserts; for example, coolant can flow through a cooling body to promote improved heat transfer from the moldable material and through the insert attached to the cooling body. In some of the present molds, cooling bodies can be used with existing mold inserts. Additionally, some of the present cooling bodies are compatible with molds having insert-eject functionality.

Some embodiments of the present molds comprise first and second mold portions, each having one or more recesses. For some molds, the mold portions are movable relative to one another between an open position and a closed position. In some molds, when the mold portions are in the closed position, each of the recess(es) of the first mold portion cooperates with a respective one of the recess(es) of the second mold portion to define a chamber. In some molds, each of the one or more chambers includes a first cooling body coupled to (but not unitary with, in some molds) the first mold portion and a second cooling body coupled to (but not unitary with, in some molds) the second mold portion. In some molds, for each of the chamber(s), a first insert is configured to be removably coupled to the first cooling body and a second insert is configured to be removably coupled to the second cooling body such that, when the first and second inserts are respectively removably coupled to the first and second cooling bodies, the first and second inserts cooperate to define a cavity within the chamber. Some molds comprise one or more of the first inserts and one or more of the second inserts wherein, for each of the chamber(s), one of the first insert(s) is coupled to the first cooling body and one of the second insert(s) is coupled to the second cooling body.

In some molds, each of the first and second inserts comprises silicon carbide. In some molds, the mold cavity is configured to receive a thermoplastic material.

In some molds, each of the first and second cooling bodies comprises a thermally conductive material. In some molds, each of the first and second cooling bodies has opposing first and second faces, where the second face is configured to be removably coupled to (is coupled to, in some molds) one of the first and second inserts. In some molds, the first insert and the second insert are each configured to be in contact with respectively the first cooling body and the second cooling body exclusively through the second face of respectively the first cooling body and the second cooling body. In some molds, each of the first and second cooling bodies has an inlet and an outlet and defines a fluid cavity in fluid communication with the inlet and the outlet. In some molds, for each of the first and second cooling bodies, the fluid cavity is closer to the second face than the first face.

In some molds, the chamber(s) comprise two or more chambers. In some molds, for each of one or more sets of a plurality of the chambers, the first cooling bodies are in fluid communication with one another via one or more first conduits. In some molds, for each of one or more sets of a plurality of the chambers, the second cooling bodies are in fluid communication with one another via one or more second conduits. In some molds, each of the first conduit(s) has a first diameter and each of the second conduit(s) has a second diameter. In some embodiments, the second diameter is at least 20% larger than the first diameter.

In some molds, for each of the set(s) of chambers, the first cooling bodies are connected in parallel such that the inlet of each of the first cooling bodies is coupled to a common supply conduit in fluid communication with a fluid source and the outlet of each of the first cooling bodies is coupled to a common exhaust conduit in fluid communication with an exhaust. In some molds, for each of the set(s) of the chambers, the second cooling bodies are connected in series such that a supply conduit in fluid communication with a fluid source is coupled to the inlet of one of the second cooling bodies, an exhaust conduit in fluid communication with an exhaust is coupled to the outlet of one of the second cooling bodies, and one or more conduits are disposed between the second cooling bodies such that when fluid flows from the supply conduit, the fluid flows consecutively through each of the second cooling bodies before flowing through the exhaust conduit. In some molds, the mold comprises three or more of the chamber(s). In some molds, at least one of the set(s) of the chambers comprises three or more second cooling bodies connected in series. In some molds, the set(s) of the chambers comprise two or more sets of the chambers; in some of such molds, the second cooling bodies of at least one of the sets are not in fluid communication with the second cooling bodies of other ones of the sets.

In some molds, each of the second cooling bodies is movable within a respective one of the recess(es) of the second mold portion between a first position and a second position. In some molds, when one of the second cooling bod(ies) is in the second position, the second cooling body is closer to the face of the second mold portion that, when the mold portions are in the closed position, faces the first mold portion than when in the first position.

Some embodiments of the present methods comprise moving a first mold portion and a second mold portion relative to one another from an open position to a closed position. In some methods, the mold portions cooperate to define one or more chambers when in the closed position. In some methods, each of the mold chamber(s) comprises a first cooling body coupled to (but not unitary with, in some methods) the first mold portion, a second cooling body coupled to (but not unitary with, in some methods) the second mold portion, a first insert removably coupled to the first cooling body, and a second insert removably coupled to the second cooling body such that the first and second inserts cooperate to define a mold cavity. Some methods comprise, before moving the first and second mold portions, and for at least one of the chamber(s), decoupling a third insert from the first cooling body and a fourth insert from the second cooling body, and removably coupling the first insert to the first cooling body and the second insert to the second cooling body. In some methods, the third and fourth inserts are configured to cooperate to define a mold cavity having a shape different from a shape of the mold cavity defined by the first and second inserts. In some methods, the coupling is performed without placing the first and second inserts in fluid communication with the first and second cooling bodies. Some methods include receiving, at each of the mold cavit(ies), a thermoplastic material.

Some methods comprise cooling the received thermoplastic material with the first and second cooling bodies. In some methods, each of the first and second cooling bodies comprises opposing first and second faces and an inlet and an outlet. In some methods, for each of the first and second cooling bodies, the first face is coupled to one of the mold portions and the second face is removably coupled to one of the first and second inserts. In some methods, each of the first and second cooling bodies defines a fluid cavity closer to the second face than the first face. In some methods, cooling comprises, for each of the first and second cooling bodies, receiving fluid at the inlet from a fluid source, conveying the received fluid to the fluid cavity, conducting, through one of the first and second inserts, heat from the thermoplastic material to the cooling body to heat the conveyed fluid, and transmitting the heated fluid through the outlet and outside of the cooling body. In some methods, cooling comprises, for each of the chamber(s), receiving fluid at the inlet of the first cooling body at a rate within 10% of the rate at which fluid is received at the inlet of the second cooling body. In some methods, cooling is performed until the thermoplastic material solidifies.

In some methods, the one or more chambers comprise two or more chambers. In some of such methods, cooling comprises receiving, at the inlet of at least two of the first cooling bodies, fluid from a common supply conduit. In some of such methods, cooling comprises conveying, to an exhaust, fluid from the outlet of at least two of the first cooling bodies along a common exhaust conduit. In some of such methods, cooling comprises receiving, at the inlet of at least one of the second cooling bodies, fluid conveyed from the outlet of another one of the second cooling bodies.

Some methods comprise moving the first mold portion and the second mold portion relative to one another from the closed position to the open position. In some methods, for each of the second cooling bod(ies), the solidified thermoplastic material is coupled to the second insert when the mold portions are in the open position. Some methods comprise, for each of the second cooling bod(ies), moving the second cooling body relative to the second mold portion. In some methods, each of the second cooling bod(ies) is moved closer to the face of the second mold portion that, when the mold portions are in the closed position, faces the first mold portion. Some methods comprise, for each of the second cooling bod(ies), ejecting the solidified thermoplastic material from the moved second insert.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIGS. 1A and 1B are side views of an embodiment of the present molds when first and second portions of the mold are in the open configuration and the closed configuration, respectively.

FIGS. 1E and 1F are, respectively, a top view of the first mold portion and a bottom view of the second mold portion of the mold of FIGS. 1A and 1B when no inserts are attached to the cooling bodies thereof.

DETAILED DESCRIPTION

Figure 1C:
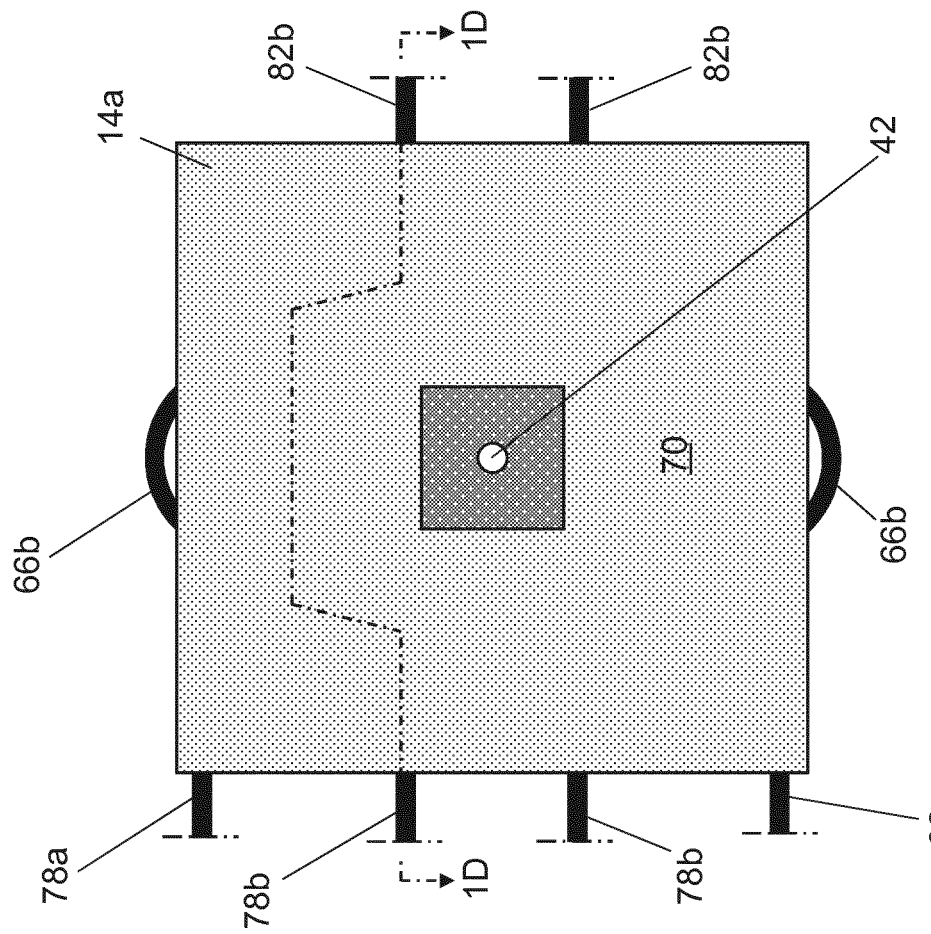
FIG. 1C is a bottom view of the mold of FIGS. 1A and 1B when the first and second mold portions are in the closed configuration.
Figure 1D:
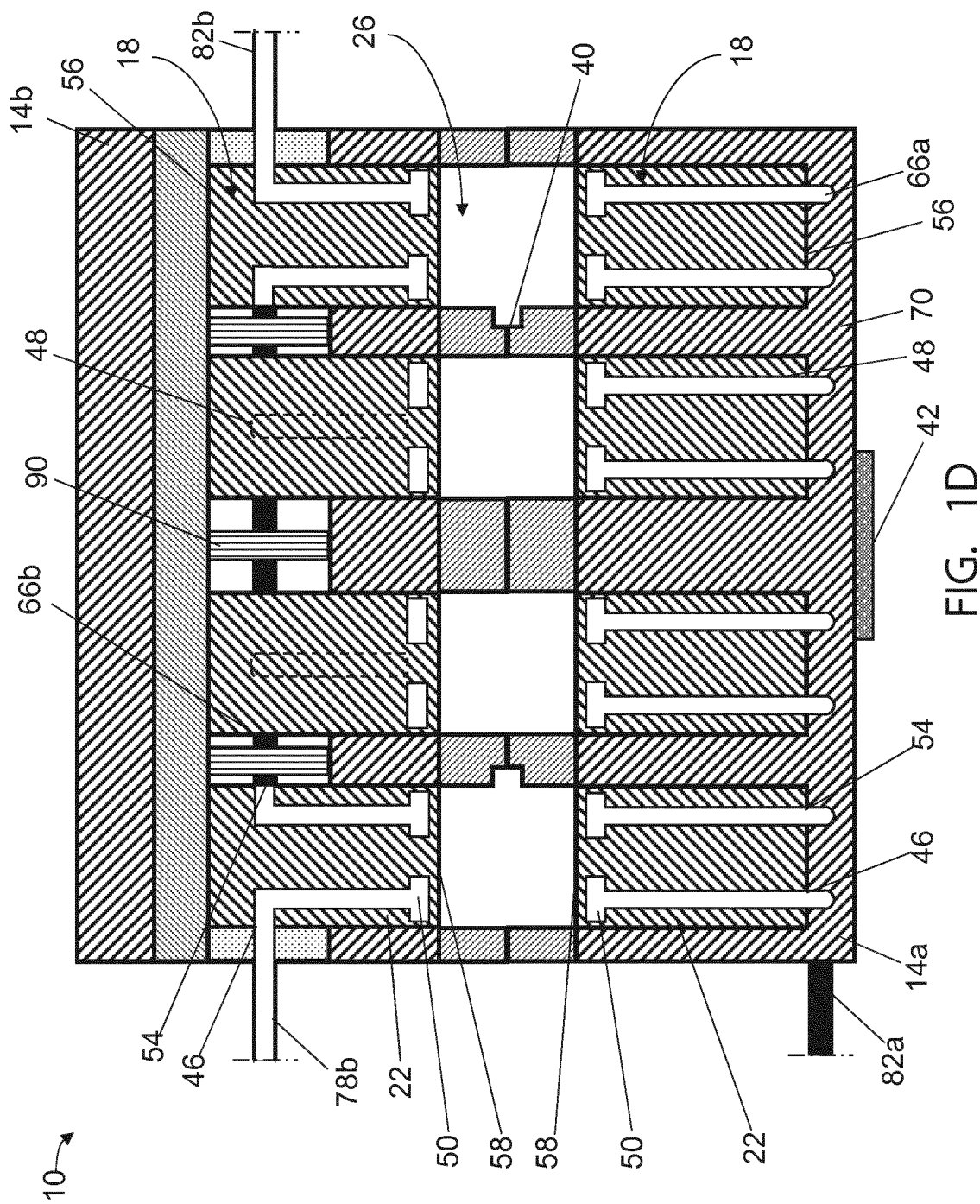
FIG. 1D is a sectional view of the mold of FIGS. 1A and 1B, taken along line 1D-1D of FIG. 1C when no inserts are attached to the cooling bodies of the mold.
Figure 3A:
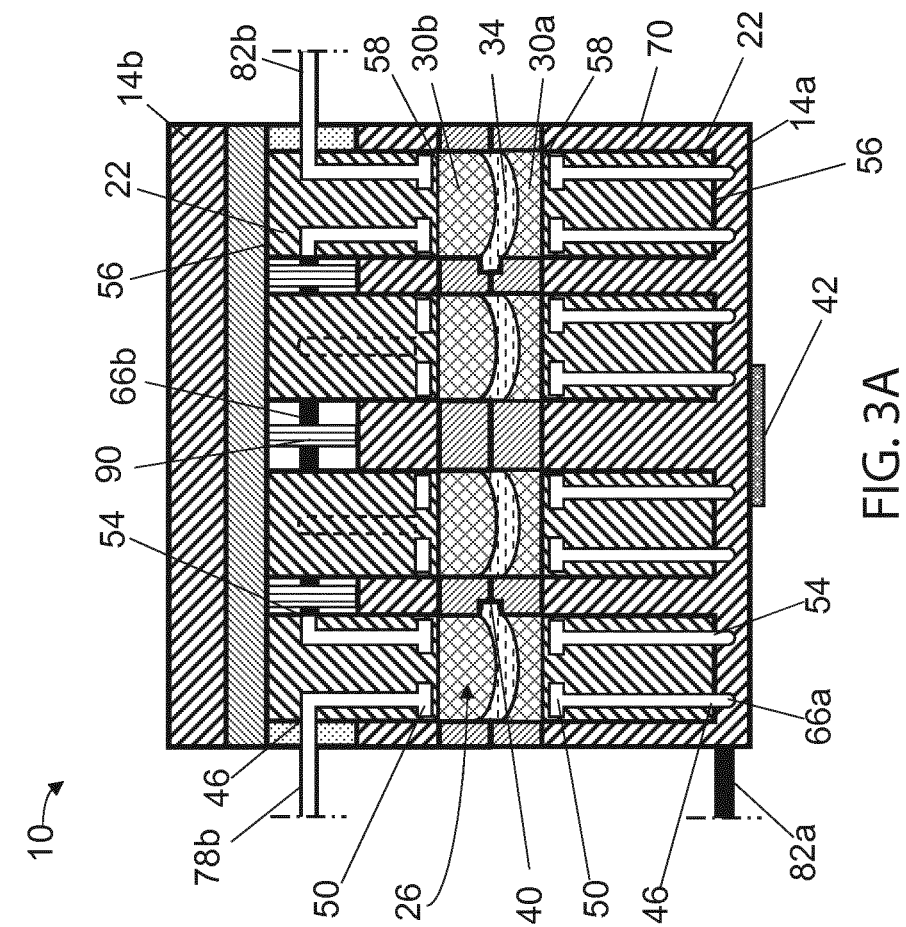
FIG. 3A is a sectional view of the mold of FIGS. 1A and 1B when inserts are attached to the cooling bodies thereof, the first and second mold portions are in the closed configuration, and a moldable material is injected into the mold cavities defined by the inserts.

FIGS. 1A-1D depict an embodiment 10 of the present molds for forming one or more lenses. Mold 10 can comprise first and second mold portions 14a and 14b that are movable relative to one another between an open configuration (FIG. 1A) and a closed configuration (FIG. 1B). When mold portions 14a and 14b are in the closed configuration, complementary recesses 18 of the mold portions cooperate to define one or more chambers 26 (FIG. 1D). Mold 10 has a pair of cooling bodies 22 disposed in each of chamber(s) 26, one coupled to first mold portion 14a and one coupled to second mold portion 14b. For example, for each of chamber(s) 26, each of cooling bodies 22 can have a first face 56 coupled to a respective one of the mold portions. Each of the pair(s) of cooling bodies 22 is configured to receive inserts that can be used to form a lens. To illustrate, each of the pair(s) of cooling bodies 22 can have inserts 30a and 30b attached to a second face 58 of a respective one of the cooling bodies (FIGS. 2 and 3A-3C), where the second face is opposite first face 56. As illustrated on FIGS. 2 and 3A-3C, each of the inserts 30a and 30b is in contact with the respective one of the cooling bodies to which it is attached exclusively by the second face 58 of the respective one of the cooling bodies so as to provide good performance in terms of heat exchange as well as ease of manufacture. When mold portions 14a and 14b are in the closed configuration, inserts 30a and 30b cooperate to define a mold cavity 34 that can receive moldable material. The received moldable material can solidify to form a lens having a shape defined by mold cavity 34.

As shown, mold 10 can form multiple lenses simultaneously. To illustrate, mold 10 can have eight chambers 26, each having a pair of inserts 30a and 30b that cooperate to define a mold cavity 34. Each of mold cavities 34 can receive moldable material that is injected into sprue 42 of first mold portion 14a. When moldable material is injected into sprue 42, the material is conveyed to each of cavities 34 via runner 40, which is defined by channels 38 of faces 62a and 62b of, respectively, mold portions 14a and 14b (FIGS. 1E and 1F). As such, eight lenses can be formed at once, one for each chamber 26. While mold 10 defines eight chambers 26 when in the closed configuration, other versions of the mold can define a different number of chambers. For example, other embodiments of mold 10 can define greater than or equal to, or between any two of: 1, 2, 3, 4, 5, 6, 7, 8, 9, 10, or more chambers. The appropriate number of chambers can be based in part on throughput requirements.

Mold 10 can be used to form different lenses by using different inserts. Inserts, for example inserts 30a and 30b, can be detachable from cooling bodies 22. Inserts attached to cooling bodies 22 can therefore be readily interchanged with another pair of inserts that have a different shape and thus can be used to form a different lens. Such interchangeability eliminates the need for retooling.

Figure 2:
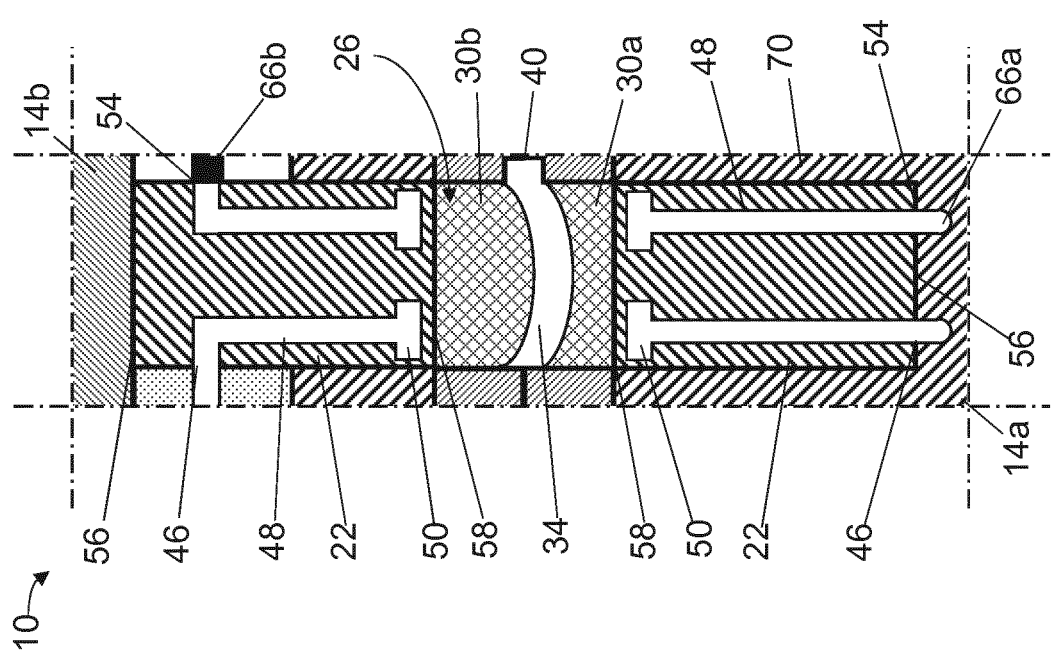
FIG. 2 is an enlarged sectional view of one of the chambers of the mold of FIGS. 1A and 1B when inserts are attached to the cooling bodies disposed therein.

In addition to providing insert interchangeability, cooling bodies 22 can provide enhanced cooling capabilities for mold 10. Moldable material injected into mold cavity 34 is typically in a molten state and must be cooled to solidify. Referring to FIG. 2, for each of chamber(s) 26, heat can be transferred from moldable material disposed in mold cavity 34, through inserts 30a and 30b, and to each of cooling bodies 22. Cooling bodies 22 can accelerate such heat transfer with a coolant, such as water or oil. To illustrate, for each cooling body 22, coolant can enter the cooling body through inlet 46, flow to a fluid cavity 50 of the cooling body, and exit the cooling body through outlet 54. Fluid passageways 48 can permit coolant to flow in this manner. Fluid cavity 50 can be positioned and shaped, for example as an annulus, to promote desirable flow characteristics and to facilitate heat transfer. Not to be bound any particular theory, fluid cavity 50 can promote turbulence and thereby improve the coolant's ability to collect heat. Additionally, fluid cavity 50 can be positioned proximate to second face 58 to which an insert (e.g., 30a or 30b) is attached; in this manner, heat transferred from the moldable material and through the insert is readily collected by the coolant in the fluid cavity. The coolant carries the collected heat away from cooling body 22, thereby accelerating heat transfer and reducing the time required to form a lens. The reductions in cycle time can be significant. For example, mold 10 can achieve at least a 25% reduction in cycle time compared to molds that, while otherwise similar, do not have cooling bodies.

Cooling bodies 22 can be used to achieve these reductions in cycle time without sacrificing insert interchangeability. Because coolant flows through the structures of cooling bodies 22, and not inserts attached to the cooling bodies, inserts used with the cooling bodies do not have to be specially designed for mold 10. For example, an insert can be attached to second face 58 of one of cooling bodies 22 using existing insert technology. As such, cooling bodies 22 can receive existing inserts such that mold 10 can be used without the added expense of custom inserts.

Cooling bodies 22 and inserts (e.g., 30a and 30b) used with the cooling bodies can comprise thermally conductive materials that encourage rapid heat transfer from mold cavity 34. Such thermally conductive materials can include metals, such as steel, copper, aluminum, or the like. As an example, at least a portion of each cooling body 22—such as that in which fluid cavity 50 is defined—and/or an insert attachable to the cooling body (e.g., 30a or 30b) can comprise a copper alloy or aluminum, which have relatively high thermal conductivities. Nevertheless, the insert and/or at least some portions of the cooling body can comprise steel.

Cooling bodies 22 and inserts configured to be attached thereto can alternatively, or additionally, comprise non-metals that have appropriate thermal and strength properties for use in mold 10. For example, inserts (e.g., 30a and 30b) can be manufactured from silicon carbide (SiC). A description of illustrative formulations of SiC and illustrative methods of producing SiC can be found in Properties and Characteristics of Silicon Carbide by Poco Graphite, Inc. (A. H. Rashed ed.) (2002), which is hereby incorporated by reference. Silicon carbide inserts can have high conductivity, low expansion, and moderate to high thermal capacitance compared to inserts made with conventional materials. Such properties can enhance the optical quality of lenses formed with SiC inserts. Silicon carbide used to make inserts can be densified to decrease the porosity of the material. Densification can include the addition of a dense SiC coating using chemical vapor deposition (CVD) technology, and can additionally, or alternatively, include doping SiC with materials such as titanium, silicon, and/or boron. Silicon carbide can also be suitable for use in other components of mold 10, for example, without limitation, cooling bodies 22, channels 38, body 70 (described below), and/or conduits 66a and 66b (described below). Using SiC to make at least some of these components can further promote reduced cycle times over conventional molds. In some embodiments, these components and/or inserts attached to cooling bodies 22 can comprise a SiC coating disposed on a substrate, which can comprise, for example, any of the metals described above. In some embodiments, these components and/or inserts attached to cooling bodies 22 can comprise a SiC.

Figures 3B, 3C:
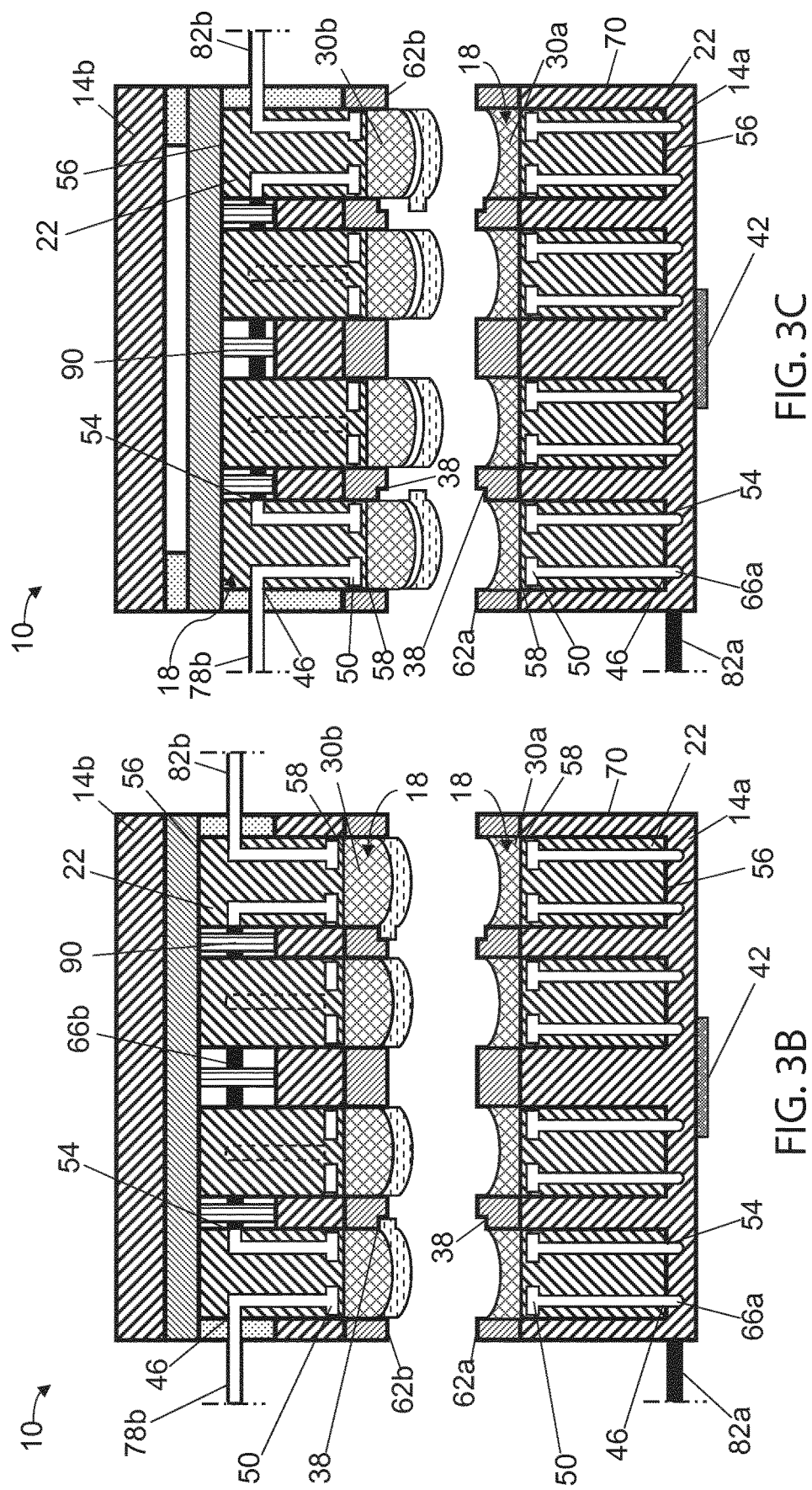
FIG. 3B is a sectional view of the mold of FIGS. 1A and 1B when the first and second mold portions are in the open configuration after the injected moldable material is solidified.
FIG. 3C is a sectional view of the mold of FIGS. 1A and 1B when the cooling bodies of the second mold portion are moved such that the inserts attached thereto extend partially beyond the face of the second mold portion to eject the solidified moldable material.

Cooling bodies 22 can be used in a mold having insert-eject capabilities. To illustrate, and referring to FIGS. 3A-3C, second mold portion 14b can be an ejector mold. After a moldable material solidifies in each of mold cavit(ies) 34 (FIG. 3A), mold portions 14a and 14b can be moved to the open configuration (FIG. 3B). When mold portions 14a and 14b are moved thereto, the solidified material can remain attached to the second mold portion. To eject the solidified material, each of cooling bod(ies) 22 of second mold portion 14b can be moved relative to its respective recess 18 towards face 62b (FIG. 3C). When the cooling body is so moved, each of the insert(s) coupled to second mold portion 14b extends, at least partially, beyond face 62b such that the solidified material is ejected from the mold.

Figure 4A:
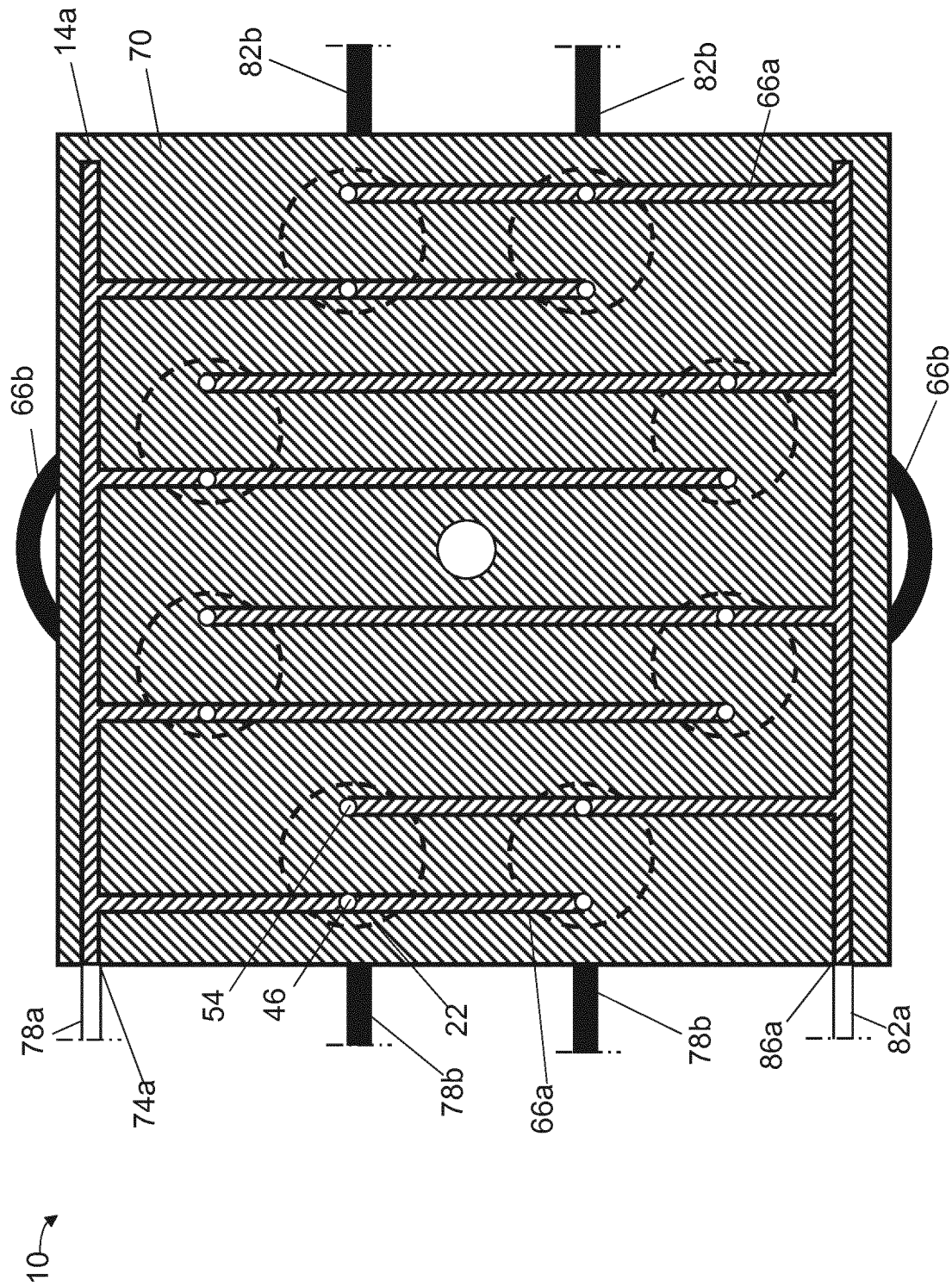
FIG. 4A is a sectional view of the mold of FIGS. 1A and 1B taken along line 4A-4A of FIG. 1B, where the outlines of the cooling bodies disposed in the recesses of the first mold portion are shown with dashed lines.

Conduits 66a and 66b of mold portions 14a and 14b, respectively, can transfer coolant to and from cooling bodies 22. The following description of conduits 66a and 66b is made with reference to mold portions that have multiple cooling bodies. For each mold portion (e.g., 14a or 14b), the manner in which conduits (e.g., 66a or 66b) connect cooling bodies 22 of the mold portion can be dictated in part by the mold portion's physical constraints and functional requirements. To illustrate, and referring to FIG. 4A, because cooling bodies 22 of first mold portion 14a—and thus conduits 66a—do not need to be movable, the conduits can be defined within a fixed body 70. Additionally, few components of mold portion 14a constrain the arrangement of conduits 66a; for example, sprue 42 can be the principal component that limits the configuration thereof, allowing the conduits to be arranged in a number of suitable manners. As shown, conduits 66a can connect cooling bodies 22 such that, when coolant is received through inlet 74a (e.g., from a coolant source (not shown) through supply conduit 78a), the conduits direct the coolant to each cooling body in parallel. Coolant exiting each cooling body 22 similarly is directed by conduits 66a, in parallel, to exhaust 86a (e.g., to exit through exhaust conduit 82a). Such parallel connections can facilitate improved heat transfer. Not to be bound by any particular theory, coolant that flows through cooling bodies 22 in series is less able to absorb heat as the coolant collects heat from each cooling body. Parallel connections can avoid this effect.

Figure 4B:
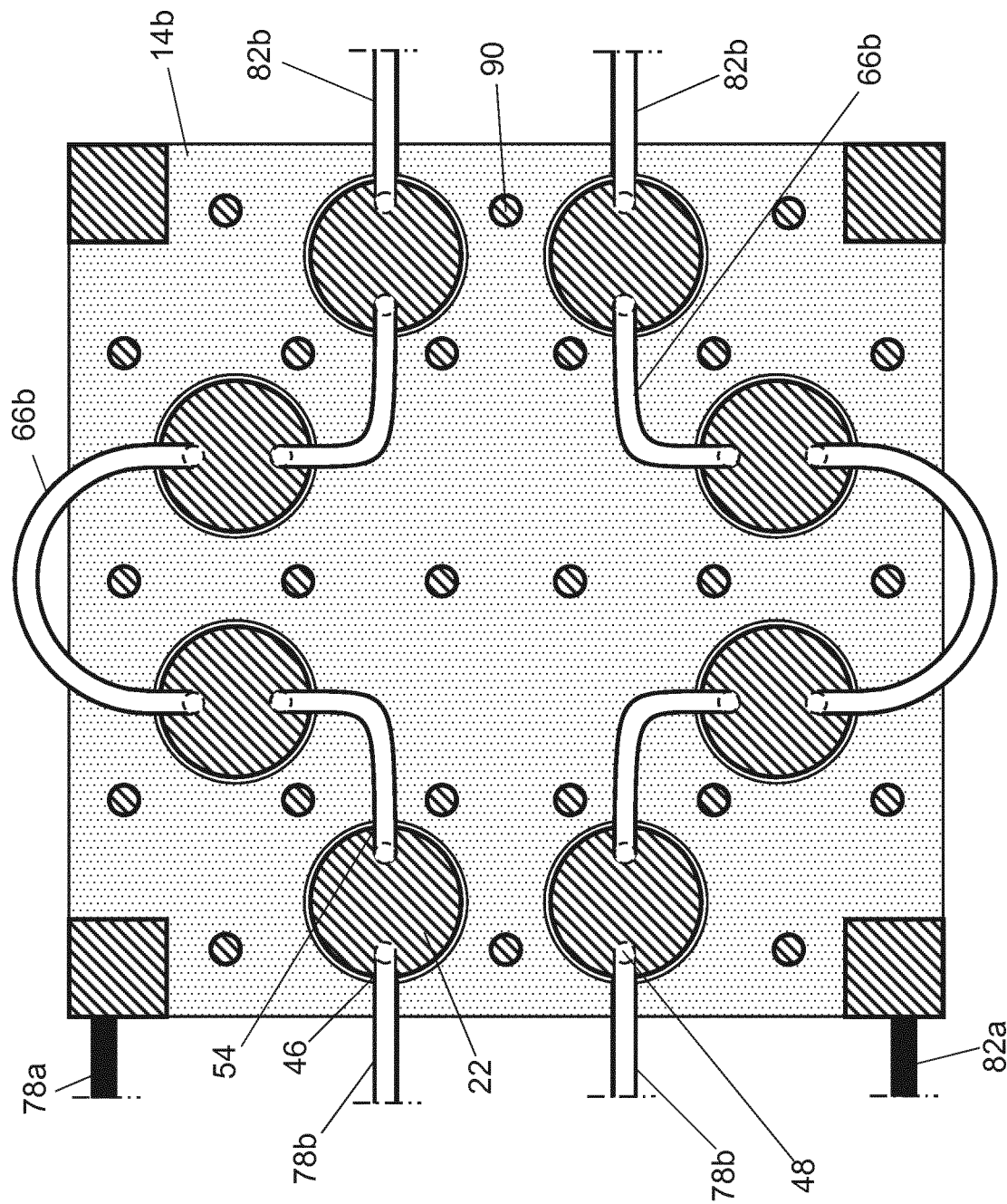
FIG. 4B is a sectional view of the mold of FIGS. 1A and 1B taken along line 4B-4B of FIG. 1B.

Referring to FIG. 4B, second mold portion 14b can impose greater constraints on the configuration of conduits 66b. Because second mold portion 14b has insert-eject functionality, conduits 66b are configured to accommodate movement of the cooling bodies within recesses 18. As shown, conduits 66b can be internal hoses that travel with cooling bodies 22 when solidified material is ejected from mold portion 14b (FIGS. 3B and 3C). Conduits 66b can be arranged such that, when so moved, the conduits are not impinged by and do not interfere with structural components of second mold portion 14b (e.g., movable supports 90). To achieve such an arrangement, conduits 66b can connect one or more sets of cooling bodies 22 in series. By way of example, and as depicted, second mold portion 14b can have two sets of four cooling bodies 22 connected in series. For each of the set(s), coolant received from a coolant source (not shown) through a supply conduit 78b can flow consecutively between cooling bodies 22 via conduits 66b before exiting second mold portion 14b through exhaust conduit 82b. Although connecting cooling bodies 22 in series can reduce their ability to cool moldable material injected into mold cavities 34 (as discussed above), using multiple sets can mitigate this effect.

Conduits 66a and 66b can be configured such that each pair of cooling bodies 22 facilitates similar rates of heat transfer through insert 30a and insert 30b. Such uniform cooling can promote good optics for a lens formed in mold cavity 34. Uniform cooling can be accomplished by maintaining a similar coolant flow rate through the cooling bodies of first mold portion 14a (hereinafter "A-side flow rate") and the cooling bodies of second mold portion 14b (hereinafter "B-side flow rate"). Conduits 66a and 66b can be sized appropriately to reduce differences between the A-side and B-side flow rates that may result from design variations between mold portions 14a and 14b. Not to be bound by any particular theory, cooling bodies connected in series (e.g., those of second mold portion 14b), all else being equal, tend to experience reductions in flow rate compared to cooling bodies connected in parallel (e.g., those of first mold portion 14a). Conduits 66b can accordingly be sized to improve the B-side flow rate, which might otherwise be lower than the A-side flow rate because cooling bodies 22 of second mold portion 14b are connected in series. For example, conduits 66b can each have a diameter larger, such as one that is at least 10%, 20%, 30%, 40%, 50%, 60%, 70%, 80%, 90%, or 100% larger, than the diameters of conduits 66a. Additionally, or alternatively, the aggregate length of conduits 66b can be shorter, such as one that is at least 10%, 20%, 30%, 40%, 50%, 60%, 70%, 80%, or 90% shorter, than the aggregate length of conduits 66a. Sizing conduits 66b in this manner can encourage more equal A-side and B-side flow rates, which otherwise might be significantly different due to the differences between mold portions 14a and 14b. Conduits 66a and 66b thus can accommodate the different physical constraints and functional requirements of mold portions 14a and 14b while providing for substantially uniform cooling to maintain good lens quality.

While mold portions 14a and 14b, as shown, have cooling bodies 22 connected in parallel and series, respectively, other versions of mold 10 can have mold portions that are configured differently. A mold portion (e.g., 14a or 14b) can have conduits that connect cooling bodies (e.g., 22) in any suitable manner—whether in parallel, series, or a combination thereof—to comply with the physical constraints and functional requirements of the mold portion. For example, while conduits 66a of first mold portion 14a can connect cooling bodies 22 of the mold portion in parallel, in other embodiments the conduits can connect the cooling bodies in series. Likewise, although as shown conduits 66a are defined by body 70 and conduits 66b are hoses, the conduits can be any suitable conduits such as, for example, pipes, hoses, channels defined in a body, and/or the like. By way of example, conduits 66a of first mold portion 14a can comprise pipes and/or hoses, and conduits 66b can be defined within a body (e.g., 70) that is configured to move with cooling bodies 22 when moldable material is ejected from mold 10. And while conduits 66b, as shown, have a larger diameter and/or shorter aggregate length than conduits 66a, in other embodiments conduits 66b can have a smaller diameter and/or longer aggregate length than conduits 66a, or the conduits can be similarly sized. For example, if mold portions 14a and 14b have similar configurations of cooling bodies, similar A-side and B-side flow rates may be achievable with similarly sized conduits.

Some embodiments of the present methods comprise a step of moving a first mold portion (e.g., 14a) and a second mold portion (e.g., 14b) relative to one another from an open configuration (FIG. 1A) to a closed configuration (FIG. 1B). When in the closed configuration, the mold portions can cooperate to define one or more chambers (e.g., 26) that each have a pair of cooling bodies (e.g., 22), for example as described above with respect to mold 10.

Some methods comprise a step of attaching a pair of inserts (e.g., 30a and 30b) to each of the pair(s) of cooling bodies before moving the mold portions to the closed configuration. Each of the pair(s) of inserts can cooperate to define a mold cavity (e.g., 34) when the mold portions are in the closed configuration. As described above, different pairs of inserts—each configured to define a cavity having a different shape—can be used with the mold; some methods comprise a step of, for one or more of the pair(s) of cooling bodies, changing a pair of inserts attached thereto for a different pair of inserts. Changing can comprise detaching the first pair of inserts from the cooling bodies and attaching the second pair of inserts thereto without placing the inserts in fluid communication with the cooling bodies. In some methods, where the mold portions define multiple chambers, the pairs of inserts attached to the cooling bodies are the same; nevertheless, in other methods, the above steps can be performed such that different pairs of inserts are used in the mold simultaneously.

Some embodiments of the present methods comprise a step of injecting moldable material into the one or more mold cavities defined by the inserts. Injecting can comprise introducing moldable material into a sprue (e.g., 42) of the first mold portion and conveying the moldable material via a runner (e.g., 40) to each of the chamber(s), where the moldable material is received into the mold cavity defined by the inserts disposed therein. Some of the present methods comprise a step of cooling the received moldable material with the cooling bodies. Cooling can be performed until the moldable material solidifies to form a product, such as a lens. For each of the cooling bodies, cooling can comprise receiving coolant at the inlet (e.g., 46) of the cooling body, conveying the coolant to a fluid cavity (e.g., 50), and conducting heat from the moldable material to the cooling body. The heat can be conducted through the insert attached to the cooling body and can heat the coolant. Cooling can further comprise, for each of the cooling bodies, transmitting the heated coolant through the outlet (e.g., 54) of the cooling body such that the coolant carries the heat away and accelerates cooling. Cooling can be performed such that the A-side flow rate is within 10%, for example less than or substantially equal to, or between any two of: 10%, 8%, 6%, 4%, or 2%, of the B-side flow rate. Such relative A-side and B-side flow rates can be accomplished by using appropriately sized conduits (e.g., 66a and 66b, as described above) and/or by supplying coolant at the appropriate pressures to each of the mold portions.

As described above, in embodiments where the mold portions define multiple chambers, the first mold portion can have cooling bodies ("A-side cooling bodies") connected in parallel and the second mold portion can have one or more sets of cooling bodies ("B-side cooling bodies") connected in series. Accordingly, in some methods, cooling comprises receiving, at the inlets of at least two of the A-side cooling bodies, coolant from a common supply conduit, and further comprises conveying the coolant through the outlets of the cooling bodies to a common exhaust conduit. Likewise, in some methods, cooling comprises, for each of the set(s) of the B-side cooling bodies, transmitting coolant consecutively through the cooling bodies such that fluid transmitted from the outlet of one of the cooling bodies is received at the inlet of at least one other of the cooling bodies.

Some embodiments of the present methods comprise a step of ejecting the moldable material after it solidifies. Ejecting can comprise moving the mold portions to the open configuration such that the moldable material is coupled to the insert(s) attached to the B-side cooling bod(ies). When the mold portions are in the open configuration, ejecting can further comprise moving each of the B-side cooling bod(ies) towards the face of the second mold portion (e.g., 62b) such that the insert attached thereto extends at least partially beyond the face and the moldable material is ejected.

Moldable material suitable for use in the present molds and methods can comprise thermoplastics, glasses, metals, elastomers, and/or the like. Examples of suitable plastics include, for example, acrylonitrile butadiene styrene, polypropylene, polyoxmethylene, polycarbonate, polyvinyl chloride, nylon, acrylic, styrene, polyether imide, or a combination thereof. The selection of a moldable material can be based in part on the desired characteristics of a product to be formed. For example, a transparent moldable material may be suitable for forming lenses. While some embodiments are described with reference to inserts that can be used to form lenses, some of the present molds and methods can be used with inserts configured to make other products. Non-limiting examples of such products include, for example, containers, lids, switches, toys, medical devices, automotive parts, handles, knobs, tools, hardware, plugs, and/or the like. Coolant suitable for use in the present molds and methods can comprise any suitable fluid, including liquids and gases. For example, and without limitation, suitable coolants can include water, oils, air, hydrogen, and/or the like.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for creating one or more optical articles, the method comprising:
   moving a first mold portion and a second mold portion relative to one another from an open position to a closed position in which the first and second mold portions cooperate to define one or more chambers, each of the one or more chambers comprising
      a first cooling body coupled to the first mold portion,
      a second cooling body coupled to the second mold portion,
      a first insert removably coupled to the first cooling body, and
      a second insert removably coupled to the second cooling body such that the first and second inserts cooperate to define a mold cavity of one or more mold cavities;
   receiving, at each of the one or more mold cavities, a thermoplastic material; and
   cooling the received thermoplastic material with the first and second cooling bodies,
   wherein each of the first and second cooling bodies comprises opposing first and second faces, an inlet, and an outlet, the first face of the respective first and second cooling bodies being coupled to one of the first and second mold portions and the second face of the respective first and second cooling bodies being removably coupled to one of the first and second inserts, each of the first and second cooling bodies defining a fluid cavity closer to the second face than the first face,
   wherein the one or more chambers comprise two or more chambers,
   wherein, for each of one or more sets of a plurality of the chambers,
      the first cooling bodies are in fluid communication with one another via one or more first conduits, each of the one or more first conduits having a first diameter, and
      the second cooling bodies are in fluid communication with one another via one or more second conduits, each of the one or more second conduits having a second diameter, each of the one or more second cooling bodies being movable within a respective recess of the second mold portion between a first position and a second position in which the second cooling body is closer than when in the first position to the face of the second mold portion that, when the mold portions are in the closed position, faces the first mold portion,
   wherein, for each of the one or more sets of the chambers, the first cooling bodies are connected in parallel such that:
      the inlet of each of the first cooling bodies is coupled to a common supply conduit in fluid communication with a fluid source, and
      the outlet of each of the first cooling bodies is coupled to a common exhaust conduit in fluid communication with an exhaust,
   wherein, for each of the sets of the chambers, the second cooling bodies are connected in series such that:
      a supply conduit in fluid communication with a fluid source is coupled to the inlet of one of the second cooling bodies,
      an exhaust conduit in fluid communication with an exhaust is coupled to the outlet of one of the second cooling bodies, and
      the one or more second conduits are disposed between the second cooling bodies such that when fluid flows from the supply conduit, the fluid flows consecutively through each of the second cooling bodies before flowing through the exhaust conduit,
   wherein the cooling comprises, at each of the first and second cooling bodies:
      receiving, at the inlet, fluid from the fluid source,
      conveying the received fluid to the fluid cavity,
      conducting, through one of the first and second inserts, heat from the thermoplastic material to the cooling body to thereby heat the conveyed fluid, and
      transmitting, through the outlet, the heated fluid outside of the cooling body.

2. The method according to claim 1, wherein the second diameter is at least 20% larger than the first diameter.

3. The method of claim 1, wherein the first insert and the second insert are each configured to be respectively in contact with the first cooling body and the second cooling body exclusively through the respective second face of the first cooling body and the second cooling body.

4. The method of claim 1, wherein the cooling comprises:
   receiving, at the respective inlet of at least two of the first cooling bodies, fluid from the common supply conduit, and
   conveying, to the exhaust, fluid from the respective outlet of at least two of the first cooling bodies along the common exhaust conduit.

5. The method of claim 1, wherein the cooling comprises receiving, at the inlet of at least one of the second cooling bodies, fluid conveyed from the outlet of another one of the second cooling bodies.

6. The method of claim 1, further comprising:
   before moving the first and second mold portions, for at least one of the chambers:
      decoupling a third insert from the first cooling body,
      decoupling a fourth insert from the second cooling body,
      removably coupling the first insert to the first cooling body, and
      removably coupling the second insert to the second cooling body,
   wherein the third and fourth inserts are configured to cooperate to define a mold cavity having a shape different from a shape of the mold cavity defined by the first and second inserts, and wherein the coupling is performed without placing the first and second inserts in fluid communication with the first and second cooling bodies.

7. The method of claim 1, wherein the cooling is performed until the thermoplastic material solidifies.

8. The method of claim 7, further comprising:

moving the first mold portion and the second mold portion relative to one another from the closed position to the open position in which, for each of the one or more second cooling bodies, the solidified thermoplastic material is coupled to the second insert; and for each of the one or more second cooling bodies:

moving the second cooling body, relative to the second mold portion, closer to the face of the second mold portion that, when the mold portions are in the closed position, faces the first mold portion, and ejecting the solidified thermoplastic material from the second insert.

9. The method of claim 1, wherein the cooling comprises, for each of the one or more chambers, receiving fluid at the inlet of the first cooling body at a rate within 10% of the rate at which fluid is received at the inlet of the second cooling body.

* * * * *